(12) United States Patent
Kishimi et al.

(10) Patent No.: US 7,332,245 B2
(45) Date of Patent: Feb. 19, 2008

(54) ELECTRODE FOR ELECTROCHEMICAL DEVICES AND BATTERY USING THE SAME

(75) Inventors: Mitsuhiro Kishimi, Kyoto (JP); Hiroshi Fukunaga, Suita (JP)

(73) Assignee: Hitachi Maxell Ltd., Ibaraki-shi (JP)

( * ) Notice: Subject to any disclaimer, the term of this patent is extended or adjusted under 35 U.S.C. 154(b) by 578 days.

(21) Appl. No.: 10/465,845

(22) Filed: Jun. 20, 2003

(65) Prior Publication Data

US 2004/0026239 A1  Feb. 12, 2004

(30) Foreign Application Priority Data

Jun. 21, 2002 (JP) ............ P 2002-182230
Dec. 17, 2002 (JP) ............ P 2002-365139

(51) Int. Cl.
*H01M 4/64* (2006.01)
*H01M 4/72* (2006.01)
*C25B 11/02* (2006.01)

(52) U.S. Cl. ............ 429/209; 429/233; 429/234; 429/237; 429/243; 429/244; 204/288

(58) Field of Classification Search ............ 429/209, 429/233, 234, 237, 243, 244; 204/288
See application file for complete search history.

(56) References Cited

U.S. PATENT DOCUMENTS

| | | | |
|---|---|---|---|
| 5,543,250 A * | 8/1996 | Yanagihara et al. | 429/241 |
| 5,824,435 A * | 10/1998 | Kawano et al. | 429/223 |
| 6,444,366 B1 * | 9/2002 | Kawano et al. | 429/241 |
| 6,455,201 B1 * | 9/2002 | Sugikawa | 429/242 |
| 6,582,855 B1 * | 6/2003 | Miyamoto et al. | 429/235 |
| 6,800,399 B2 * | 10/2004 | Matsumoto | 429/241 |
| 6,994,902 B2 * | 2/2006 | Fukunaga et al. | 428/131 |

FOREIGN PATENT DOCUMENTS

| | | | |
|---|---|---|---|
| JP | 7-335208 A | | 12/1995 |
| JP | 7-335209 A | | 12/1995 |
| JP | 09-007603 | * | 1/1997 |
| JP | 9-265991 A | | 10/1997 |
| JP | 10-106580 A | | 4/1998 |

* cited by examiner

*Primary Examiner*—Patrick Joseph Ryan
*Assistant Examiner*—Angela J. Martin
(74) *Attorney, Agent, or Firm*—Birch, Stewart, Kolasch & Birch, LLP (57) ABSTRACT

An electrode according to the present invention employs the metal plate having the specified structure as the electrode substrate. The metal plate 51 has a plurality of protuberances 54 that are alternately protruded on both front and back sides thereof. Each of the protuberances 54 is formed in a pyramid shape in which an area of upper bottom 52 (a protruded part) thereof is smaller than that of a lower bottom 53. The upper bottom 52 in each of the protuberances 54 is formed with an aperture 56 having blanking burr 55 blinked in a substantially pyramid shape along a direction from the upper bottom 52 to the lower bottom 53 so that an opening 52*a* of the upper bottom part is formed in a polygon shape. Further, the size of each portions is set in accordance with $c > s \geq 0.1$ mm$^2$ and $0.2 \leq h/d \leq 0.95$ where c is the area of the upper bottom of each of the protuberances 54, s is the area of the opening 52*a* of the upper bottom parts, h is the height of the blanking burrs 55 is h, and d is the total thickness of the electrode substrate before compressing.

11 Claims, 9 Drawing Sheets

ELECTRODE FOR ELECTROCHEMICAL DEVICES AND BATTERY USING THE SAME

BACKGROUND OF THE INVENTION

1. Field of the Invention

The present invention relates to an electrode used for electrochemical devices such as batteries or capacitors, and a battery using the same.

2. Description of the Related Art

In electrochemical devices such as batteries or capacitors, various examinations for a low cost production have been continued. For example, in case-of alkaline storage batteries, which utilize nickel hydroxide that is a kind of nickel oxide as a positive electrode, there has been widely employed a non-sintered type nickel electrode. The non-sintered type nickel electrode can be formed in such a manner that the nickel hydroxide is dispersed into water or a solvent with a binder or a viscosity thickening agent and the like to form a paste state and then the paste is to be applied on and filled into a conductive porous substrate such as a foamed nickel and the like. Further, in case of the non-sintered type nickel electrode with utilization of the porous substrate, there has been commonly employed poly-tetra-fluoroethylene (PTFE) as a binder thereof. This process requires a stable compound that is hardly oxidized as a binder, since the nickel electrode is over charged with an alkaline solution in a battery and exposed at an oxygen gas atmosphere. The PTFE best satisfies such a requirement.

In case of the non-sintered type nickel electrode, however, there is a problem such as a high cost in production although the non-sintered nickel electrode has an advantage in which the filling density of nickel hydroxide as an active material is enhanced and it is also easy to produce tile electrode. The high cost problem is caused by processes to manufacture the porous substrate such as a foamed nickel and the like in which urethane foam is commonly coated with metal such as nickel and the like, sintered at a reduction atmosphere, and removed.

Thus, it is suggested that a substrate, in which metal fiber and the like are put on the upper and lower surfaces of a metal plate, be used as a collector (refer to Japanese Unexamined Patent Application Publication No. H 09-265991). And it is also suggested that a metal plate, which is, compressed with an embossing process and provided with concave-convex parts, be used as a substrate (refer to Japanese Unexamined Patent Application Publication No. H 10-106580)

However, in case of utilizing the substrate provided with concave-convex parts made by an embossing process, the cost for producing a positive electrode may be reduces, but a binder of PTFE causes such a problem that the positive electrode mixture is easy to fall off from the substrate. The reason is as below. When the PTFE is compressed, it tends to be linearly extended. Therefore, if processes such as pressing, cutting off and the like are performed, the positive electrode mixture may slide off from the substrate, resulting in easy peeling off and falling off of the mixture therefrom. Further, when a battery is charged and discharged, the active material is repeatedly expanded and contracted, resulting in easy peeling off of the positive electrode mixture from the substrate and then increasing of the contact resistance between the substrate and the positive electrode mixture. As a result, the battery is difficult to be charged as well as generation of oxygen gas becomes increased during charging. Furthermore, as a result, the battery cannot obtain a sufficient discharge capacity, resulting in early deterioration in cycle. To solve such problems, other binders have been examined, but binders having any good characteristics have not been realized yet.

Further, there has been another problem that the above substrate, compared to a conventional porous substrate, has bad current-collection performance and cannot enhance the coefficient of utilization of a positive electrode.

Further, such a surface-processed substrate is easy to be cut off due to doctor blades when continuously applying. Or, there is a problem that it is difficult to make a uniform coating application on the substrate. Further, parts of the substrate tends to be exposed at a surface of the resulting electrode after molding, resulting in cause of short. Furthermore, if intervals between doctor blades keep broaden to avoid the above problem, it causes problem center protrusion of the substrate becomes difficult, resulting in difficulty of uniform coating on both surfaces of the substrate. The amount of active materials falling off from the substrate increases, thereby it is difficult to collect current and decreases the coefficient of utilization.

SUMMARY OF THE INVENTION

Accordingly, it is an object of the present invention to provide an electrode and a battery In order to solve such a problem occurred in case where a metal plate is used as a substrate and to get the high coefficient of utilization of the active materials at low cost and good productivity.

According to a first aspect of this invention, there is provided an electrode for electrochemical device, comprising an electrode substrate made of a metal plate and an electrode mixture layer formed on the substrate, which comprises metal, metal oxide or metal hydroxide as active materials, wherein said metal plate has a plurality of protuberances that are alternately protruded on both front and back surfaces thereof; each of the protuberances is formed in a truncated pyramid shape in which an area of an upper bottom part thereof is smaller than that of a lower bottom part; the upper bottom part of each of the protuberances is formed with an aperture having blanking burrs blanked in a substantially pyramid shape along a direction from the upper bottom to the lower bottom so that an opening of the upper bottom of each of the protuberances; and said metal plate is formed in accordance with $c > s \geq 0.1$ mm$^2$ and $0.2 \leq h/d \leq 0.95$ where c is the area of the upper bottom of each of the protuberances, S is the area of the aperture of the upper bottom part and h is the height of the blanking burrs, said metal plate with the electrode mixture is compressed such that a thickness t of the resulting electrode after compressing is in accordance with $0.2 \leq t/d \leq 0.95$ where d is the total thickness of the electrode substrate before compressing.

Figure 1:
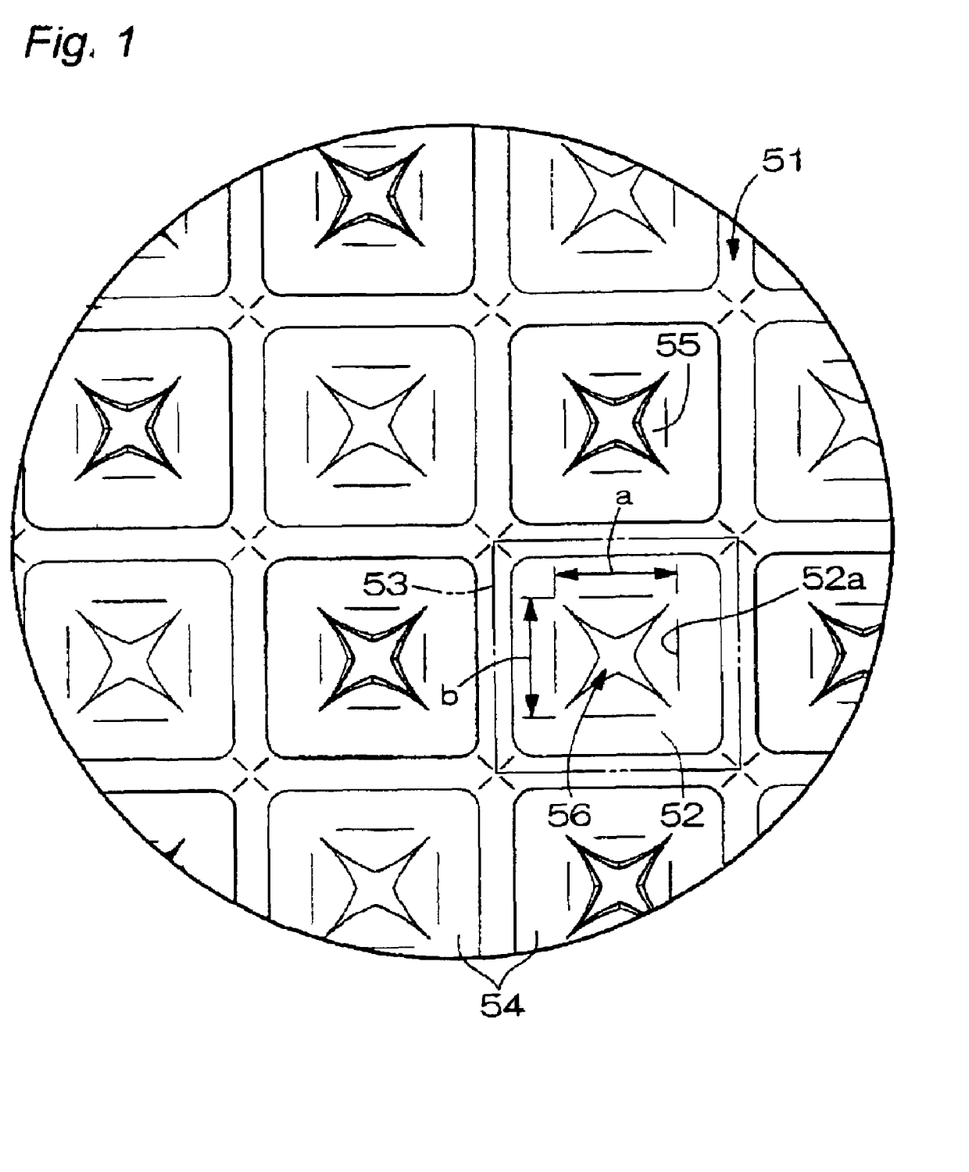
FIG. 1 is a schematic plane view for illustrating a substrate structure and a method of fabricating the substrate when the substrate is fabricated according to a first embodiment, which shows enlarged front and back surfaces of a metal plate (substrate) that are respectively formed with checkerboard shaped protuberances thereon.
Figure 2:
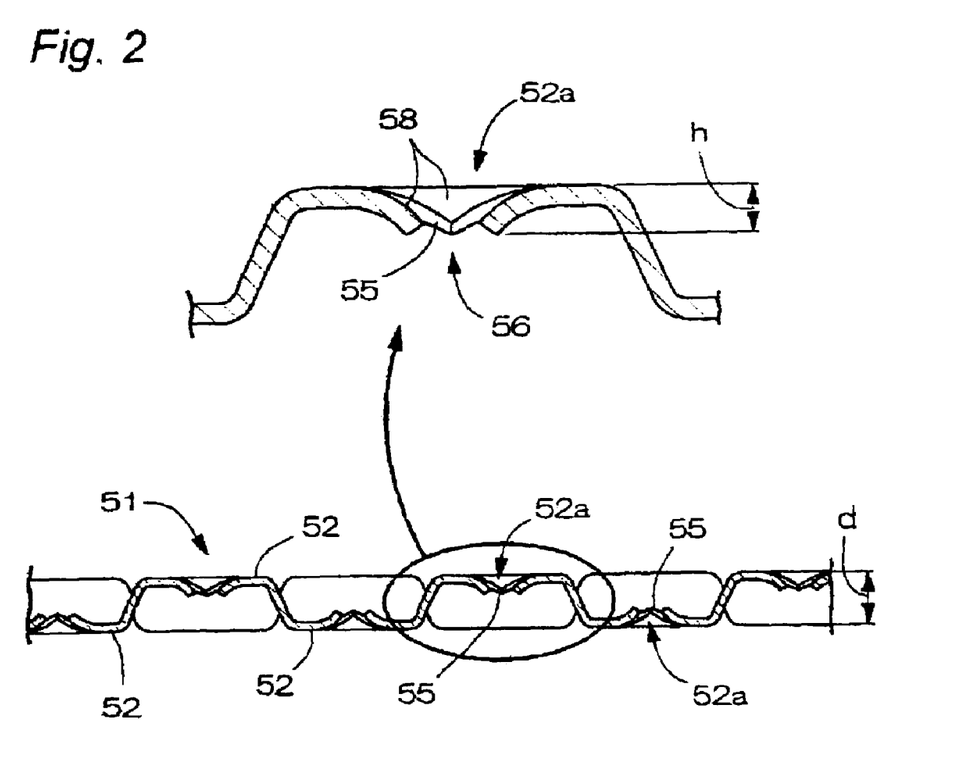
FIG. 2 is a longitudinal cross section view of the metal plate.

In a preferred embodiment as shown in FIGS. 1 and 2, according to the present invention, the electrode substrate is formed from the metal plate having a specified structure. The metal plate 51 has a plurality of protuberances 54 that are alternately protruded on both front and back surfaces thereof. Each of the protuberances 54 is formed in a pyramid shape in which an area of an upper bottom 52 (a protruded part) thereof is smaller than that of a lower bottom 53. The upper bottom 52 of each of the protuberances 54 is formed with an aperture 56 having blanking burrs 55 blanked in a substantially pyramid shape along a direction from thy upper bottom 52 to the lower bottom 53 so that an opening 52a of the upper bottom part is formed in a polygon shape.

Further, the size of each portions is set in accordance with $c > s \geq 0.1$ mm$^2$ and $0.2 \leq h/d \leq 0.95$ when c is the area of the upper bottom of each of the protuberances 54, S is the area of the opening 52a of the upper bottom parts, h is the height of the blanking burrs 55, and d is the total thickness of the electrode substrate before compressing.

Figure 9:
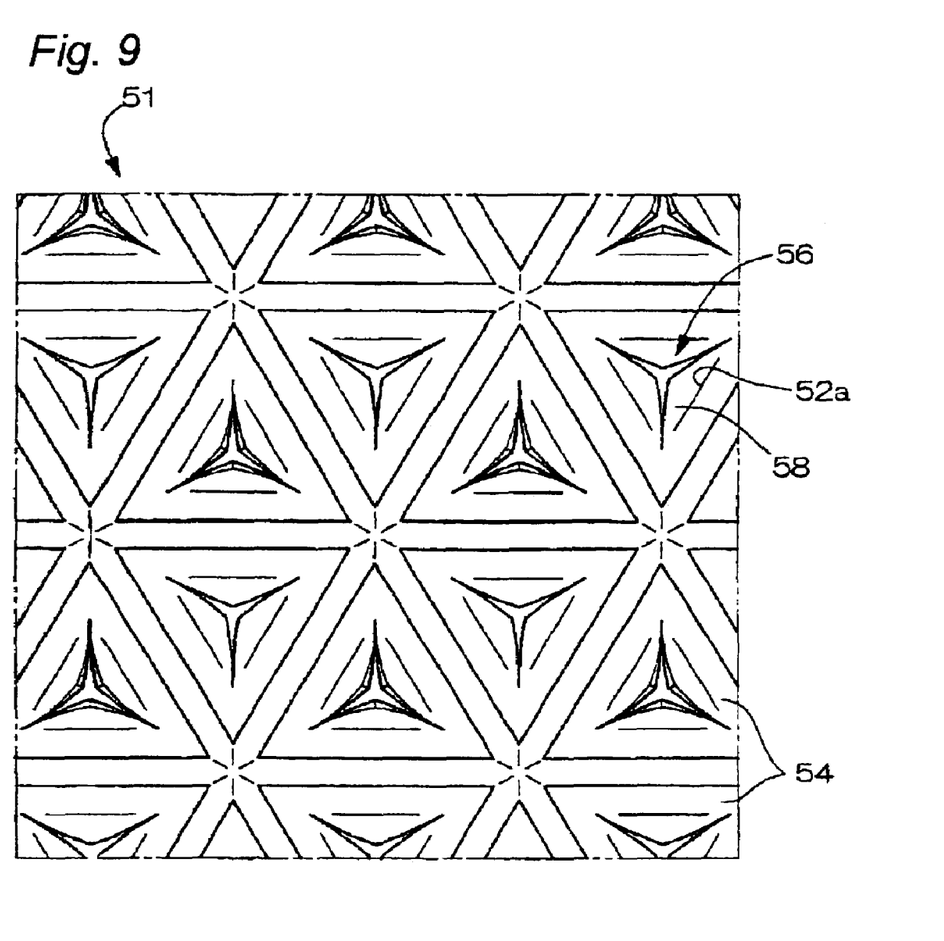
FIG. 9 is a part of enlarged plane view showing a metal plate according another embodiment of the present invention.

Therefore, according to the invention, it is possible to obtain an electrode provided with high coefficient of, utilization of the active materials and good productivity at a low cost. In this invention, the shapes of protuberances 54 of the metal plate 51 or the openings 52a are not limited to a rectangular shape. For example, the protuberances 54 may be formed in a triangular pyramid shape and the openings 52a may be formed in a triangular shape, as shown in FIG. 9. They may be formed in a polygonal shape such as a pentagon shape or a hexagon shape and the like. The metal plane 52 in this invention hereinafter may include the variation as above.

Figure 3A:
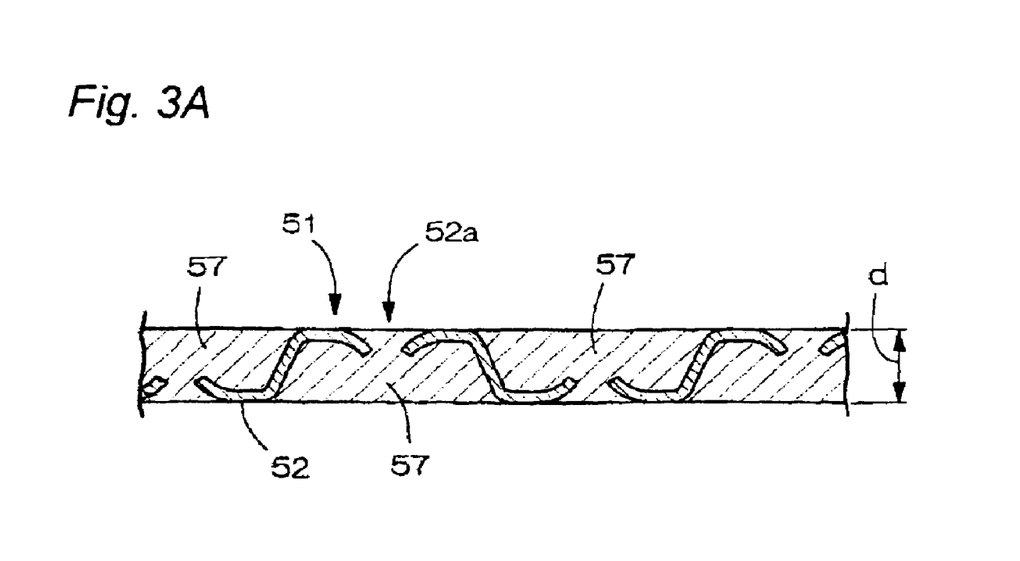
FIG. 3A is a longitudinal cross sectional side view of a metal plate before compressing and FIG. 3B is a longitudinal cross sectional side view of a metal plate after compressing.

Further, according to a second aspect of this intention, there is provided an electrode comprising an electrode substrate made of a metal plate having a specified structure, as shown in FIG. 3A, wherein electrode mixture layers made from metal, metal oxide or metal hydroxide as active materials, are formed on both surfaces of the electrode substrate (collector), and the metal plate with the electrode mixture is subjected to compression process to get the thickness t of the electrode after compressing in the range of 0.08 to 1.5 mm.

In a preferred embodiment of electrode according to the present invention, each of the protuberances 54 of the metal plate 51 may be formed in a triangular pyramid shape as shown in FIG. 9 or may be formed in a quadrangular pyramid shape as shown in FIG. 1. The quadrangular pyramid shape is easy to be produced and proper to maintain the mixture on the metal plate. As shown in FIG. 1 and FIG. 9, it is easy to be produced and it is preferred that the opening 52a of the upper bottom is formed in any one of an equilateral triangle shape, a rectangular shape, and a square shape. In case of the polygon opening 52a as shown in FIG. 1, it is preferred that the side length of the polygon opening 52a is more than 0.1 mm. It is proper that the electrode mixture layer is incorporated with styrene-acrylic resins or polystyrene as a birder of the electrode mixture layer 57.

Figure 3B:
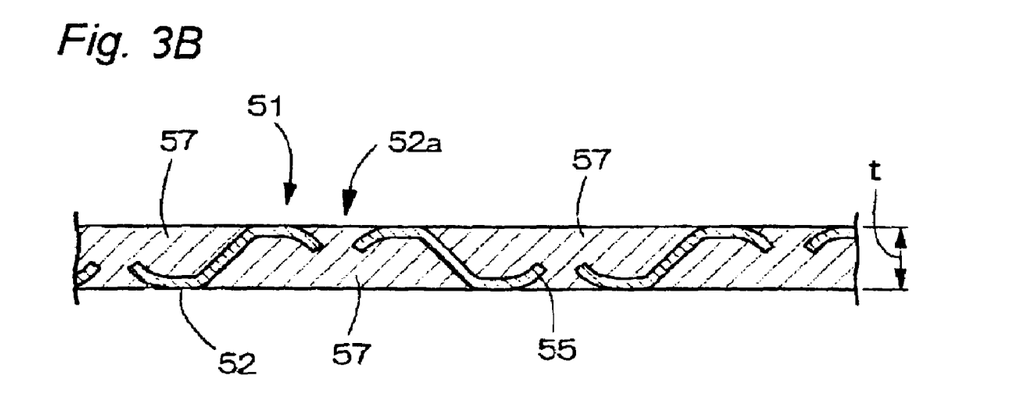

As shown in FIG. 3B, a tip or front edge part of the blanking burr 55 of the metal plate 51 is not exposed on the surface of the electrode mixture layer 57. As shown in FIG. 2 and FIG. 3A, it is preferred that the total thickness d of the substrate before compressing is in the range of 0.085 to 1.2 mm. It is also preferred that the total weight of the substrate is in the range of 50 to 450 g/m².

Figure 8:
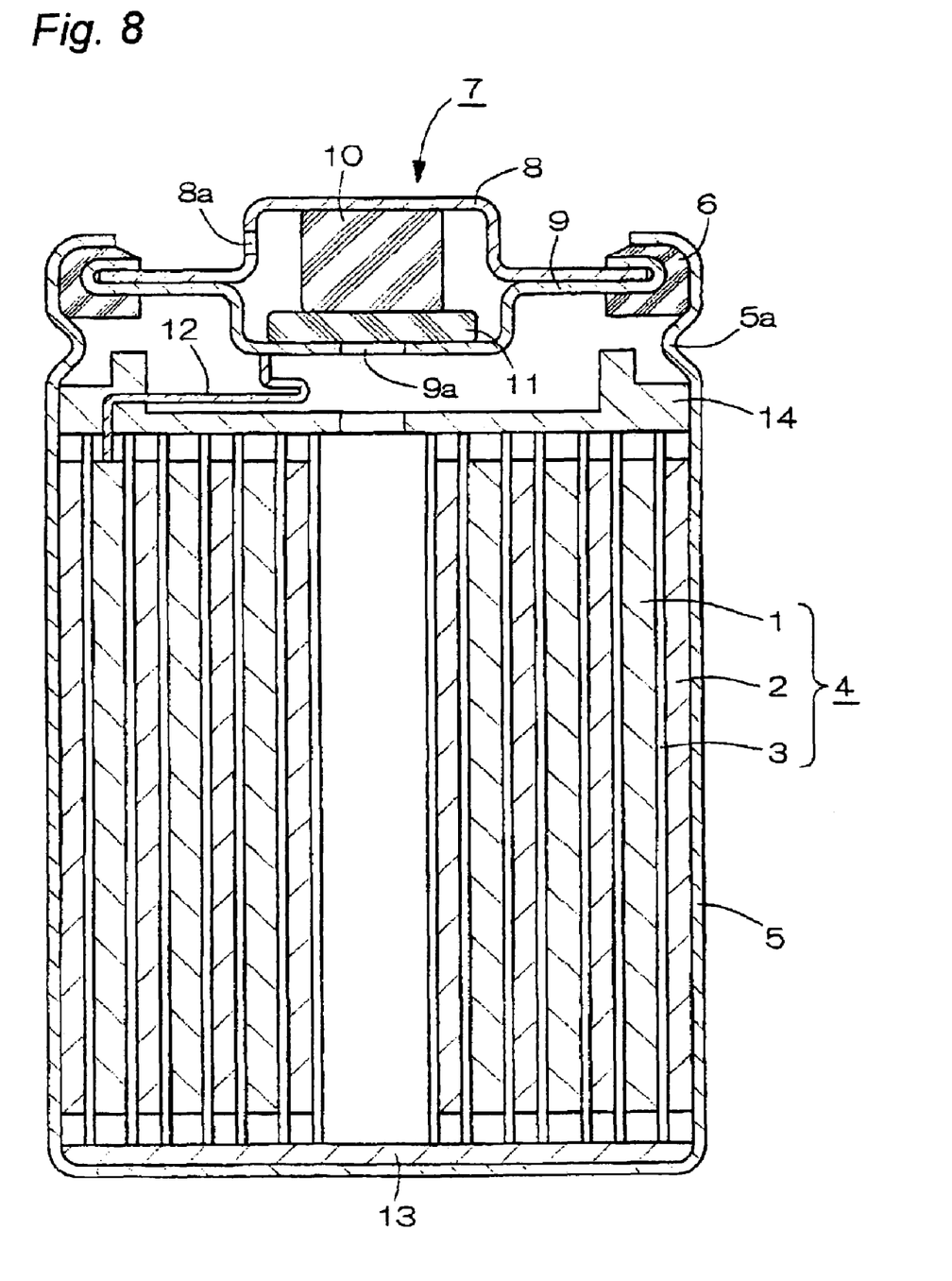
FIG. 8 is a cross sectional view showing a structure of a battery (a single 4 typed alkaline storage battery) fabricated according to the first embodiment.

Furthermore, according to a third aspect of the present invention, there is provided a battery provided with such an inventive electrode as a positive electrode or a negative electrode. FIG. 8 shows an embodiment of battery employing the electrode thus constructed as a positive electrode.

According to this invention, the electrode as a positive electrode can make it possible to implement the alkaline battery which is excellent in cycle characteristics.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DESCRIPTION OF THE PREFERRED EMBODIMENTS

The electrode of the present invention has the structure as described above. Hereinafter, it will be explained in detail about progress of this invention to adopt such a structure, the reason for increasing the coefficient of utilization of active materials at a low cost by the electrode structure and the reason for obtaining an electrode having good productivity by the electrode structure. Furthermore, it will be explained in more detail concerning the structure that may be adopted in embodiments of the present invention.

The inventors have studied an optimum structure of the substrate based on the findings that there is a problem in low current-collection performance of the substrate in case of using a two dimensional substrate made of a processed metal plate in place of a three dimensional porous substrate such as a conventional foamed nickel and that the same characteristics as a three dimensional porous substrate characteristics could be obtained in the two dimensional substrate if the problem in the two dimensional substrate is solved.

Further, to solve a low adhesive strength between a positive electrode mixture and a substrate, the inventors have studied a combination of an optimum binder and a substrate structure.

Furthermore, the inventors have sufficiently considered productivity concerning the substrate structure.

First, regarding the substrate structure, the present invention is characterized in that as a substrate the metal plate having a specified structure may be utilized as described above. Such a structure serves to enhance the coefficient of utilization of active materials and at the same time, to increase a charging performance or charge capacity of a paste incorporated therein with mixtures, resulting in enhancement of the current-collection performance. In detail, the increased coefficient of utilization of the active materials can be obtained by making a close-packed formation of polygon pyramid shaped protuberances such as a triangular pyramid shape or a quadrangular pyramid shape on an front surface of the metal plate, thereby the current-collection performance can be enhanced. The upper bottom (a protrusion, that is, a protruded portion of protuberance) of the polygon pyramid shaped protuberances such as a triangular pyramid shape, a quadrangular pyramid shape and the like is formed smaller in the area than the lower bottom so that a paste incorporated therein with mixtures(hereinafter, just a paste) may easily be entered therein, resulting in increasing a filling rate of a paste during applying. Adjacent protuberances are protruded in a pyramid shape alternately on the front and back surfaces to get a symmetrical substrate with respect to the front and back surfaces of the substrate, resulting in uniform amount of applying the paste to the front and back surfaces. Such a structure prevents the electrode from being beat during a press process while the electrode is formed, thereby increasing productivity. The aperture of the; blanking burrs in each of the protuberances is formed in a polygon shape (for example, the opening of the upper bottom is formed in a tetragonal shape), thereby the opening of the upper bottom is allowed to be broad, resulting in increased charge capacity and characteristic in charging.

If the area of the upper bottom of the pyramid shaped protuberances is designated as c, and the area of the opening of a polygon shaped aperture at the upper bottom part is designated as s, it is desirable that the formula thereof may be represented by $c > s \geq 0.1$ mm$^2$. In other words, for example, in a case where the polygon shaped aperture is formed in a tetragonal shape, it is desirable that the area ab of the opening of the upper bottom satisfy the formula $ab \geq 0.1$ mm$^2$ under the condition of $c > ab$, wherein the length of one side (the long side in a case where the upper opening is formed in a rectangular shape) out of the four sides of the opening at the upper bottom of a tetragonal shaped aperture is a, the length of the adjacent side (the short side in a case where the upper opening is formed in a rectangular shape) is b (that is, a=b in a case where the upper opening is formed in a square shape, a>b in a case where the upper opening is formed in a rectangular shape), and the area of the upper bottom of the protuberance is c. In a case where a metal plate (may be called two dimensional material in view of being formed in a plate shape) is used as a substrate as in the present invention, if the substrate is applied with a paste having the same viscosity (about 800 to 2000 mPa·s) as that of a conventional paste applied or a conventional three dimensional foamed body, the paste tends to flow down during drying process, thereby the electrode plate having a uniform thickness can not be obtained. However, such a problem can be solved by increasing the viscosity in the paste up to 4000 to 20000 mPa·s. However, such a high viscosity prevents the paste from being filled into the opening of the blanking burr, and accordingly the mixture layer easily peels off from the metal plate by a pressing process. However, if the area of the opening of the blanking burr (s, i.e., ab in the case of the tetragonal shaped aperture) is more than 0.1 mm$^2$, the paste can easily be filled in the opening and the peeling off of the mixtures from the metal plate can be prevented.

Particularly, when the length b of one side (a short side in the case where the opening of the upper bottom is formed in a rectangular shape) of the opening at the upper bottom is more than 0.1 mm, the paste is easily filled into the aperture, thereby peeling off of the fixture from the substrate can be prevented sufficiently.

Since the blanking burr is formed along a direction from the upper bottom to the lower bottom so that a metal protuberance with a keen edge does not get protruded beyond a surface of the substrate, no substrate can be cut off by the doctor blade during a continual application process and an uniform coated substrate can be obtained to get no exposed substrate on the surface of the electrode after molding, resulting in prevention of short. In this case, it is necessary that the substrate meets the condition $0.2 \leq h/d \leq 0.95$ where the total thickness of the substrate is d, and the height of the blanking burr is h. If the formula $0.2 \leq h/d \leq 0.95$ is not satisfied with the design of the substrate, the front end of the blanking burr that is formed from the upper bottom of the pyramid shaped protuberance toward the lower bottom may possibly be protruded from an utmost surface of the substrate of a lower bottom side, additionally depending on the formation angle or the length thereof. Further, according to the formula $0.2 \leq h/d$, the maintaining capability of the mixtures may be enhanced, productivity may be improved. Further, since the burrs are formed near active materials, the distance from the active material to the substrate is reduced, thereby increasing conductivity thereof.

The paste incorporated therein with nickel oxide as an active material is applied on the substrate, and then a drying process is performed and a compressing process is performed. When the thickness of the electrode after compressing is set as t, the compression ratio (t/d) should be maintained as 0.2 to 0.95. Or, when the thickness of the electrode after compressing is 0.08 to 1.5 mm, protuberances of the substrate are configured so as not to be exposed on a surface of the electrode. In a case where a compression ratio is less than 0.2, or the thickness of the elect ode after compressing is less than 0.08 mm, a number of holes within the electrode become decreased, thereby electrolyte is difficult to be filled therein and discharging characteristic is deteriorated. Further, since the electrode should be compressed with a high pressure, the electrode accordingly tends to be extended thereby active materials easily fall off from the electrode. On the other hand, in a case where the compression ratio is more than 0.95, or the thickness of the electrode after compressing is more than 1.5 mm, since the number of the holes within the electrode becomes large, the active materials cannot be contacted sufficiently from each other, thereby some active materials become unavailable and sufficient capacity cannot be obtained accordingly. If a protuberance of the substrate, i.e., an acute angle formed substrate having the burr shape is protruded on the surface of the electrode, the electrode is caught by a doctor blade during a paste application process in the aforementioned manner, or a separator is punched by the protuberances during winding the electrode, resulting in short circuit. For this reason, there is needed an electrode structure in which any protuberance of the substrate is not protruded on a surface of the electrode.

Further, if the total thickness of the substrate including a polygon pyramid shaped protuberance is set in a range of 0.085 to 1.2 mm, a mixture maintaining capability is enhanced. It is desirable that the weight of the substrate is more than 50 q/m$^2$ considering the substrate strength or the electric resistance and the like, and it is desirable that the weight of the substrate is less than 450 g/m$^2$ from the aspect of its workability or a high capacity trend.

The present invention may be applied to a nickel electrode for an alkaline storage battery, for instance. In this case, the nickel electrode is fabricated as follows. Conduction assistant agents such as nickel hydroxide as the active materials, styrene resins, cobalt hydroxide and the like and viscosity thickening agents such as carboxy methyl cellulose and the like are dispersed into a solvent such as water to thereby prepare a paste incorporated with positive electrode mixtures. The paste is applied on and filled into the substrate and dried, thereby a positive electrode mixture layer is formed on the substrate, and the resultant structure is compressed and molded, thereby a positive electrode is completed.

It is desirable that the nickel hydroxide may bemused as being coated thereon with cobalt compound particles to enhance the coefficient of utilization of the positive electrode active material. Since the coating amount of the cobalt compound is determined in the range of increasing conductivity and at the same time having no effect on the filling amount of active materials in the case of using in the positive electrode, it is desirable that the weight ratio of the cobalt compound regarding nickel hydroxide is let in a range of 2 to 6% (in a ratio of 2 to 6 parts by weight of cobalt compound to 100 parts by weight of nickel hydroxide). It is more desirable that the weight ratio of the cobalt compound regarding nickel hydroxide is set in a range of 3 to 5%. Further, with utilization of the highly oxidized coating cobalt having the oxidation number as being in the range of 2.6 to 3.1, it can be obtained an increase in conductivity, a good cycle characteristic, and a good storage capacity. If the oxidation number of the cobalt is less than 2.6, the oxidation is insufficiently progressed, it is easy to reduce as well as high coefficient of utilization cannot be obtained due to its reduction, thereby good cycle characteristic and good storage capacity cannot be obtained. Further, if the oxidation number of the cobalt is more than 3.1, the oxidation is over progressed, thereby the conductivity is reduced and high coefficient of utilization cannot be obtained accordingly. A method for increasing a valence value of the coated cobalt is to oxidize nickel hydroxide, which was already coated with cobalt compound on the surface, with oxidants such as hydrogen peroxide and the like and alkaline solution. Another method is a method of mixing nickel hydroxide, cobalt compound, oxidant, and alkaline solution to get a coated one with the cobalt compound having a high valance value. Further, as nickel hydroxide there are lifted zinc-solution treated one for enhancing cycle characteristics, and cobalt-solution treated one for enhancing charge efficiency. It is desirable that the solution amount of zinc is 2 to 5% relative to nickels, and the solution amount of cobalt is 0.7 to 3%, preferably 1 to 2%. Further, for enhancing charge efficiency is, active materials may be solid-solution treated with strontium, (Sr), scandium (Sc), aluminum (Al), gallium (Ga), titanium (Ti), zirconium (Zr), niobium (Nb), bismuth (Bi), molybdenum (Mo), silver (Ag), stannum (Sn), antimony (Sb), vanadium (V), chromium (Cr), manganese (Mn), ferrite (Fe), copper (mu) and the like. Or, they may be segregated on the surface of active materials.

As the conduction assistant agent, for example, there are listed metal powder of nickel, cobalt, copper and the like, carbon powder of graphite or acetylene black and the like, metal compound of stannic oxide, cobalt oxide or cobalt hydroxide, and the like. In a case of combination with alkaline electrolyte, cobalt compound is preferable because of capability of formation of conductive network by conductive compound. Further, for enhancing conductivity in the mixtures and improving coefficient of utilization of active materials, a particle state of the conduction assistant agents is generally used. Further, for improving charge efficiency, there may be added calcium hydroxide, calcium oxide, zinc oxide, and cadmium hydroxide.

As viscosity thickening agents, there are listed cellulose group such as methyl cellulose, hydroxy ethyl methyl cellulose, hydroxy propyl cellulous, carboxy methyl cellulose and the like, polyethylene, polyacryl amide, polyvinyl pyrrolidone, polyethylene oxide, poly-N-vinyl acetamide, polyacrylic acid and the like.

A general binder is for example, PTFE. To solve a problem of weak adhesive strength between the positive electrode mixture and the substrate, it is possible to select a blinder having a strong adhesive strength to a substrate. However, such a binder sometimes deteriorates reactions of active materials, and increases contact resistance between the mixtures and the substrate, resulting in a possibility of bigger problem that the current-collecting performance in the substrate is deteriorated. In addition to PTFE, styrene-acrylic resins or polystyrene resins may be used as a suitable binder. In a case where the metal plate is used a positive electrode substrate, styrene acrylic resins or polystyrene resins are incorporated in the positive electrode mixture to enhance adhesive strength of the positive electrode mixture, thereby enabling to process the positive electrode in a higher compression ratio during a positive electrode compressing process, resulting in an electrode having high capacity. Further, the above resins realize reduction of extending, bending and peeling off of the mixtures in the electrode, thereby increasing yield. Further, the substrate thus constructed may resist expansion and contraction caused by the charging and discharging, and suppress an increase in contact resistance or creation of oxygen during charging. As a result, the electrode provided with the substrate in place of a three dimensional foamed body, can give an alkaline storage battery a good cycle characteristic and a high coefficient of utilization even in the case where a positive electrode is constructed using the substrate.

Styrene acrylic resin used for the binder is compounded by an emulsion polymerization of polymers of organic molecules including styrene derivative unit (styrene group unit) and organic molecules including acrylic group derivative unit (acrylic group unit), in which hydrophilic property functional group and the like may be included. Acrylic group unit includes, for example, methacrylic acid, methylacrylate, ethyl acrylate, propyl acrylate, butyl, acrylate, octyl acrylate, methyl methacrylate, ethyl methacrylate, propyl methacrylate, butyl methacrylate, octyl methacrylate, 2-hydroxy ethyl acrylate, 2-hydroxy ethyl methacrylate, 2-hydroxy propyl methacrylate, acrylonitrile, methacrylonitrile, vinyl acetate, acrylamide, methacrylamide, N-methyl acrylamide, N-dimethyl acrylamide, N-isopropyl acrylamide, vinyl pyrrolidone, itaconic acid, 2-acrylamide-2-methyl-propane sulfonic acid, 2-acryl amide ethane sulfonic acid, 2-methacrylamide ethane sulfonic acid, 3-methacrylamide propane sulfonic acid, acrylic acid methyl sulfonic acid, methacrylic acid methyl sulfonic acid, acrylic acid -2-ethyl sulfonic acid, methacrylic acid-2-ethyl sulfonic acid, acrylic acid-3-propyl sulfonic acid, methacrylic acid-3-propyl sulfonic acid, acrylic acid-2-methyl-3-propyl sulfonic acid, methacrylic acid-2-methyl-3-propyl sulfonic acid, acrylic acid-1, 1'-dimethyl-2-ethyl sulfonic acid, methacrylic acid-1,1'-dimethyl-2-ethyl sulfonic acid, or their salt. Among them, ethyl acrylate may be suitably used. Further, polystyrene made of styrene only may be used.

Further, when a paste of positive electrode mixture is produced, styrene acrylic resins and polystyrene (hereinafter, styrene resins) may be coated with nonionic or anionic surface active agents and may generally be in a state called soap-free. It may be possible to use any one at a dispersed state in the aqueous solution. The styrene resins of three dimensionally cross-linked is preferable. Cross-linkage gives it an enhanced alkaline resistance and oxidation resistance, and then the electrode and battery having the good cycle characteristic and storage characteristic may be provided. Further, it is desirable that the weight average molecular weight of styrene resins may be in a range of 10,000 to 10,000,000, preferably 50,000 to 10,000,000, more preferably 500,000 to 10,000,000. When the weight average molecular weight is more than 10,000,000 the high adsorbing effect on a surface of the active material and a surface of the substrate may be obtained. Further, when the weight average molecular weight is less than 10,000,000, a high dispersibility in solvent may be maintained, thereby enabling to demonstrate a good film forming property of the electrode when being dried. For the reason, an electrode having a good adhesive strength maybe obtained even in a case where the coating film of mixtures is thin-film scaled for a high output.

As a solvent being used in compounding of a pasty incorporated with the mixtures, it may be used organic solvents, for example, such as representative alcohols of methanol, ethanol and isopropanol, in addition to water. These solvents may be used alone respectively, or two more solvents may be used together.

In a case where a nickel hydrogen storage battery is fabricated using the positive electrode as described above, a negative electrode may be fabricated with a cadmium electrode, a zinc electrode, a hydrogen storage alloy electrode and the like, for instance. In the hydrogen storage alloy electrode, it may be used as the hydrogen storage alloy (which is the active material) various kinds of hydrogen storage alloys such as rare earth metals —Ni group, laves group, Mg—Ni group, V—Ti—Ni group, and the like. Among them, a rare earth metal-Ni hydrogen storage alloy using a misch metal is suitably utilized. Especially, a desirable result may be obtained when it may be used hydrogen storage alloys including at least Ni, Co, Mn and Al, and in which Ni, Cop Al and Mg are in the range of 3.4 to 4.3, 0.2 to 0.7, 0.1 to 0.5, 0.1 to 0.4 and 0.01 to 0.1 respectively, by element ratio per 1 of misch metal (Mm). The conductive cobalt oxide being formed in a positive electrode is reduced by hydrogen gas produced by corrosion of hydrogen storage alloy as a negative electrode or by manganese ions produced from hydrogen storage alloy. But, since the hydrogen storage alloy thus constructed has a high capacity relatively and is hardly corroded, it is particularly useful in the battery of the present invention.

The electrode (positive electrode) is laminated with the opposite electrode (negative electrode) through a separator, as it is, or if necessary, winded in a whirlpool form like a wound electrode, then packaged together with an electrolyte into a closed case such as a metal can and the like, thereby a battery is completed. Further, the electrode of the present invention may be utilized as a negative electrode as well as a positive electrode of nickel hydroxide electrode for an alkaline storage battery as exampled above. Further, the electrode may be applied to other electrochemical devices such as an alkaline primary battery, nickel battery, lithium primary battery, lithium secondary battery, capacitor and the like. Further, the electrode may be combined with an opposite electrode and an electrolyte, thereby constricting an electrochemical device of the battery or a capacitor.

Embodiments

Hereinafter, the embodiments of the present invention will be explained. The present invention should not be limited to these embodiments, but it is possible for the skill in the art to properly change the embodiments within the scope in which the sprit of the present invention is not deviated. Further, hereinafter, "part" means a weight part, and % for indicating concentration or the amount of solid solution means a weight % if its unit is not indicates specifically.

First Embodiment

First, the positive electrode active material is made as follows. An oxidation process was carried out in a granulator dryer (FMD-10J type manufactured by Fukae Powtec company). 100 parts of nickel hydroxide particle containing 1% cobalt and 4% zinc (solid-solution) and having a 0.7 nm peak value of thin hole radius, are mixed during 10 minutes with 5 parts of an aqueous solution containing 5 weight % hydrogen peroxide and 30 weight % sodium hydroxide, and dried during 30 minutes under 100 mmHg vacuum degree at 100° C., i.e., a vacuum pressure of 100 Torr ≈13.3 kPa. Thereafter. 6 parts of cobalt hydroxide and 10 parts of 40% sodium hydroxide aqueous solution are added thereto, and dried during 40 minutes while being mixed at 110° C. at an air atmosphere.

100 parts of active material powder thus obtained were added and mixed with 5 parts of cobalt hydroxide powder, 5 parts of 2% carboxy methyl cellulose aqueous solution and 4 parts of 50% polystyrene acryl acid ethyl dispersed aqueous solution, thereby a paste containing the positive electrode mixtures was prepared.

The substrate was prepared as follows. First, as shown in FIG. 1 and FIG. 2, SPCC steel plate having a 25 µm thickness was used as a material of the metal plate 51, and both sides of front and back surfaces of the steel plate are, forced therein with rectangular pillar shaped (quadrangular pyramid shaped) protuberances 54 to be arranged in a checkerboard shape. The protuberances 54 have an square shaped upper bottom 52 of a 0.6 mm side (area: c=0.36 mm$^2$) and a square shaped lower bottom 53 of a 1.0 mm side. The upper bottom 52 of each of the protuberances 54 was provided with a square shaped tetragonal aperture 56 having blinking burrs 55 toward the lower bottom 53 and an opening 52a of 0.4×0.4 mm (one side length a=0.4 mm, the adjacent side length b=0.4 mm, the opening area of the upper bottom ab=0.16 mm$^2$) at the upper bottom. At this time, the total thickness d of the metal plate 51 including the protuberances 54 on both front and back sides was set as 0.44 mm (d=0.44 mm). The height h of the blanking burr was 0.18 mm. Further, the weight of the metal plate 51 after forming the protuberances was 215 g/m$^2$. Then, the metal plate 51 was coated with nickel having thickness 3 µm, thereby completing the substrate.

The substrate having three-dimensional structure as described above, as shown in FIG. 4, may be manufactured as follows.

Figure 4:
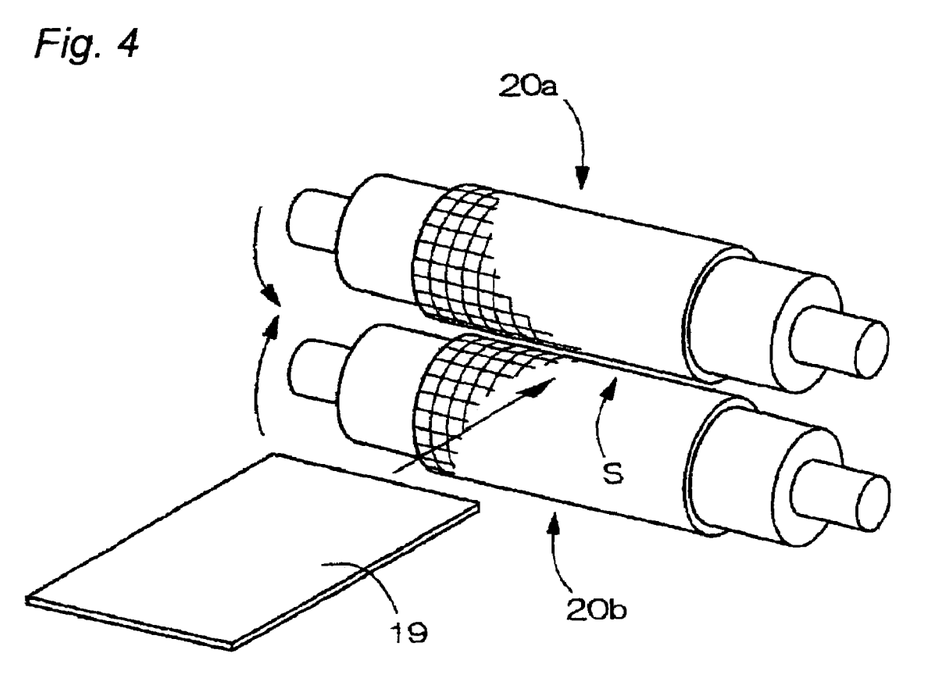
FIG. 4 is a view for illustrating a method of fabricating a porous metal body according to the present invention.
Figure 5A:
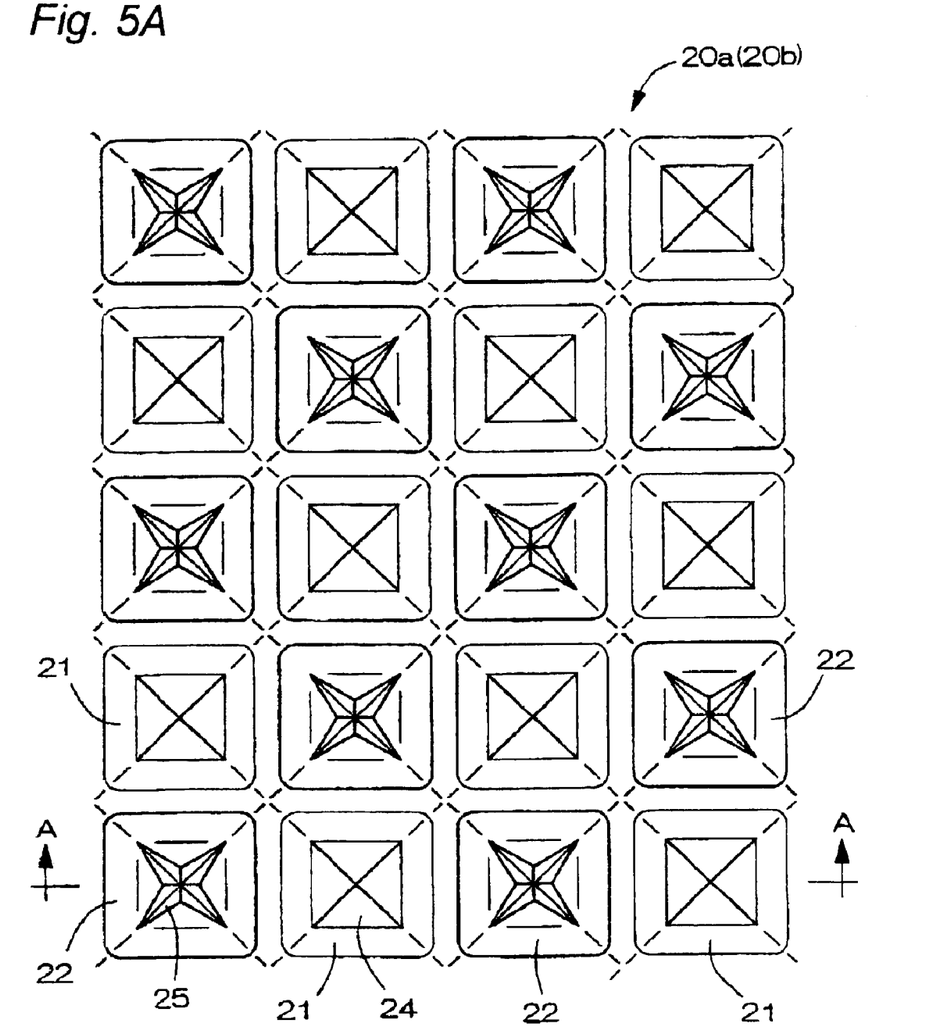
FIG. 5A is a part of enlarged plane view of an embossing roller and FIG. 5B is a cross sectional view obtained by cutting along the A-A line in FIG. 5A.
Figure 5B:
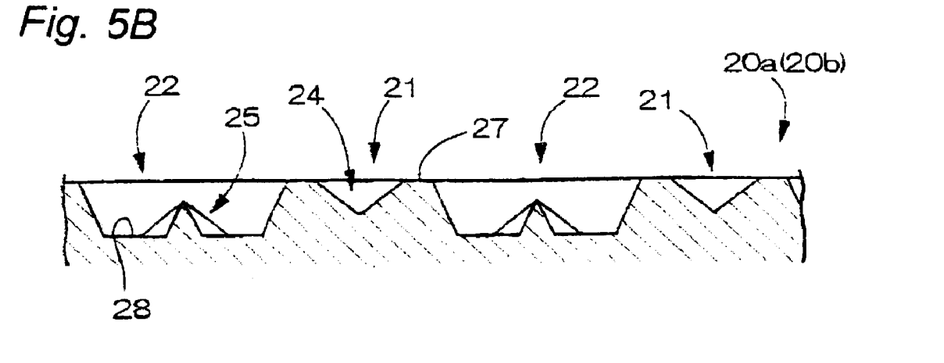

The plane metal plate 19 is subjected to passing through the gap S between a pair of upper and lower embossing rollers 20a, 20b which roll oppositely from each other. As shown in FIGS. 5A and 5B, each of the embossing rollers 2a, 2b are formed on its surface with a plurality of convex portions 21 and concave portions 22 that are arranged in a checkerboard shape and also alternately in the longitudinal and transverse directions. Each of the convex portions 21 is protruded in a quadrangular pyramid shape becoming broadened downward, and the center of the protruded portion 27 is formed with the quadrangular pyramid shaped small-concaved portion 24. Each of the concave portions 22 is formed in a quadrangular pyramid shape becoming broadened upward. Its sink portion 28 is formed at its center with a quadrangular pyramid shaped small convex portion 25. Each portions of the quadrangular pyramid forming the small convex portion 25 are formed in a sharp blade form. The convex and concave portions 21, 22 and small convex and concave portions 24, 25 appear as a square shape in a plan view.

Figure 6:
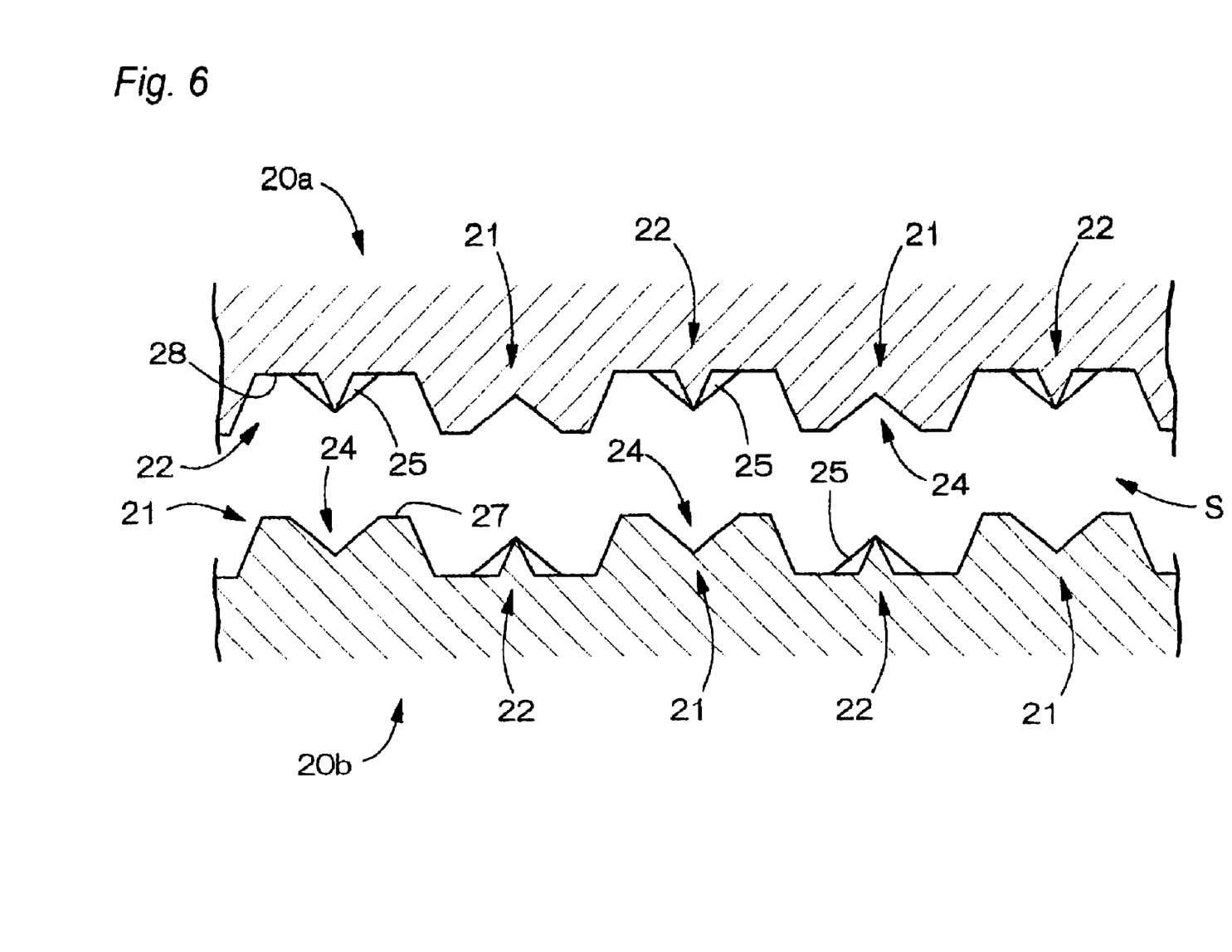
FIG. 6 is an enlarged cross sectional view for illustrating a gap structure between a pair of embossing rollers facing each other.

As shown in FIG. 6, the convex and concave portions 21, 22 and the small concave and convex portions 24, 25 of the upper and lower embossing rollers 20a, 20b are arranged differently to each other. That is, the concave portions 22 of the lower side roller 20b are positioned so as to face the convex portions 21 of the upper roller 20a, and likewise, the small concave portions 25 of the lower side roller 20b are positioned so as to face the small convex portions 24 of the upper roller 20a. That is, the facing gap S of the upper and lower embossing rollers 20a, 20b is formed in a saw toothed form where the upper and lower convex and concave portions 21, 22 and the small convex and concave portions 24, 25 are engaged each other.

Further, as shown in FIG. 4, when the plane metal plate 19 is passed through the facing gap S formed between the upper and lower embossing roller pair 20a, 20b, the quadrangular pyramid shaped protuberances 54 are formed by the upper and lower convex and concave portions 21, 24 during a embossing process so as to be alternately protruded on both front and back sides of the metal plate 19. Further, at the same time, the small concave portion 58 is formed in a quadrangular pyramid shape within each of the protuberances 54, and the small concave portion 58 is punched at its center by the small convex portion 25, thereby the opening 56 (tetragonal aperture) is formed in a cross sword form. The small concave portion 58 is formed in a full-blown 4-petaled burr.

Figure 7:
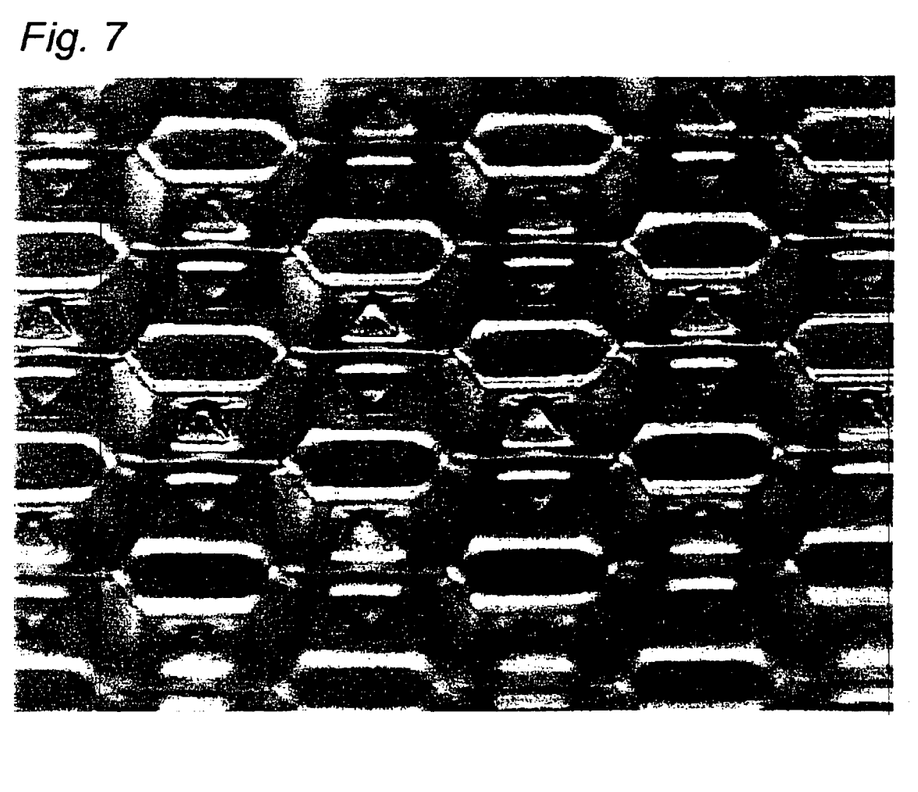
FIG. 7 is a picture (20 magnifications) that is photographed at an oblique direction relative to the substrate surface to show a concave-convex state of the substrate fabricated according to the first embodiment.

FIG. 7 is a picture (20 magnifications) that is photographed at the oblique direction relative to the substrate surface to show a concave-convex state of the substrate surface thus constructed. The substrate is satisfied with the formula c>ab and ab$\geq$0.1 mm$^2$, where one side length of the substrate is indicated by a, the adjacent side length is b (only when a$\geq$b), the area of the upper bottom of the protuberance is c, and the total thickness of the substrate including the protuberance is d. Further, the substrate is also satisfied with the formula 0.2$\leq$h/d$\leq$0.95 when the height of the blanking burrs is indicated by h. Further, FIG. 1 and FIG. 2 show schematically views illustrating protuberances 54 formed on both front and back sides of the metal plate (SPCC still plate) 51, which do not reflect the accurate size of each of the related portions.

Next, as shown in FIG. 3A, the paste containing the positive electrode mixtures was applied on the substrate and was passed through blades spaced by 0.5 mm from each other, to get a coated material having a uniform thickness. The coated material was dried during 1 hour at 85° C., and then was compressed and molded under a 9.8×103 N/cm (1 ton/cm) linear pressure so as to be formed in a sheet form and then was cut by a size of width 36 mm and length 100 mm, thereby the non-sintered type positive electrode having a theory capacity of 450 Ah was obtained. The electrode after compressing has a 0.24 mm thickness (size t) and was satisfied with the formula 0.2$\leq$t/d$\leq$0.95. At this time, as shown in FIG. 3B, the front end of the blanking burr 55 of the metal plate 51 was not exposed on the surface of the electrode mixture layer 57.

The negative electrode was manufactured as follows. Each of samples Mm, Ni, Co, Mn and Al as being on sale was heated and melted in a high frequency melting furnace to meet the composition ratio of MmNi 3.9, Co 0.6, Mn 0.35, Al 0.25 and Mg 0.05 (Mm includes 70% La, 12% Ce, 14% Nd and 4% Pr), thereby a hydrogen storage alloy was obtained. The hydrogen storage alloy was mechanically ground to obtain its powders hating a 35 μm average particle diameter. 100 parts Of the hydrogen storage alloy powder were added and mixed with 1 part of carbonyl nickel powder, 10 parts of 5% poly-N-vinyl acetamide aqueous solution and 1.7 parts of 40% styrene-2-ethylene hexyl acrylate copolymer, thereby a paste containing the negative electrode mixtures was prepared. The paste containing the negative electrode mixtures was applied on the porous substrate made of punched metal, filled and dried, thereby a negative electrode mixture layer was prepared. And then, the negative electrode mixture layer was compressed and molded to thereby form a sheet type. Then, the resultant material was cut by a size of 36 mm width and 120 mm length, thereby the hydrogen storage alloy negative electrode was prepared.

The positive electrode and negative electrode were winded through a separator formed of polypropylene nonwoven fabric, the electrode body having a turn structure capable of being obtained was inserted in a bottom cylinder shaped battery can, and then the electrolyte (28.5 weight % KOH aqueous solution including Zinc oxide of 33 g/liter and LiOH of 17 g/liter) was injected into the can, and then the opening of the battery can was sealed, thereby the single 4 typed alkaline battery as shown in FIG. 8 was fabricated.

Here, the battery structure as shown in FIG. 8 will be explained. In FIG. 8, 1 is a positive electrode, 2 is a negative electrode, 3 is a separator, 4 is an electrode body of turn structure, 5 is a battery can, 6 is a ring shaped gasket, 7 is a battery cover, 8 is a terminal plate, 9 is a sealing plate, 10 is a rubber elastic body, 11 is a rubber valve formed in one body with the rubber elastic body 10, 12 is a positive lead body, 13 is an insulator, and 14 is an insulator, respectively.

The positive electrode 1 and the negative electrode 2 have the structure as described above, respectively. However, FIG. 8 does not show the porous substrate thus prepared above and shows just a single structure for convenience. The separator 3 is made of a polypropylene non-woven fabric as described above. The positive electrode 1 and the negative electrode 2 are folded through the separator 3 and winded in a rolling form, thereby forming the electrode body 4 having a turn structure that is inserted into the battery can 5 and covered with the insulator 14. Further, the battery can 5 is provided at its bottom with the insulator 13 prior to inserting the electrode body 4 having a turn structure. Further, as not shown in FIG. 8, a part of the porous substrate is exposed around the outermost peripheral parts of the negative electrode 2, and accordingly is in contact with the inner wall of the battery can 5 so that the battery can 5 may operate as a negative terminal.

The ring shaped gasket 6 is made of nylon 66, the battery cover 7 is consisted of the terminal plate 8 and the sealing plate 9, and the opening of the battery can 5 is sealed with the battery cover 7, etc. That is, the ring shaped groove 5a in which the bottom portion is protruded inward is formed near the opening of the battery can 5 after the electrode body 4 having the turn structure, insulator 13, insulator 14, etc. are inserted into the battery can 5. The groove 5a supports a lower portion of the ring shaped gasket 6 with its inward protruded portion so that the ring shaped gasket 6 and the battery cover 7 may be arranged in the opening of the battery can 5, and be fastened inward the front part at the groove 5a of the battery can 5, thereby sealing the opening of the battery can 5. The terminal plate 8 is provided therein with gas outlet 8a, the sealing plate 9 is provided therein with the gas detecting hole 9a, and the rubber elastic body 10 and the rubber valve 11 are placed between the terminal plate 8 and the sealing plate 9. Further, the sealing plate 9 is bent around its peripheral portion so that the peripheral portion of the terminal plate 8 may be inserted into the bent peripheral portion of the sealing plate, thereby fixing the terminal plate 8 and the sealing plate 9.

This battery is maintained as being closed under a common state because the gas detecting hole 9a is closed with the rubber valve 11 under the elastic pressure of the rubber elastic body 10. However, when gas is generated in the battery and the inner pressure of the battery increases abnormally, the rubber elastic body 10 is contracted, the gap is formed between the rubber valve 11 and the gas detecting hole 9a, thereby the inner gas in the battery is discharged to the outside of the battery through the gas detecting hole 9a and the gas outlet 8a. As a result, the battery explosion caused by a high pressure may be prevented, the rubber elastic body 10 returns to the original state, and with the elastic pressure, the gas detecting hole 9a is again closed by the rubber valve 11, to thereby maintain the closed state of the battery, when the inner pressure of the battery is reduced due to the gas discharge.

The positive electrode lead body 12 is made of nickel ribbon. One terminal of the positive electrode lead body 12 is spot-welded on the supporter of the positive, electrode 2, the other terminal is spot-welded on the lower end of the sealing plate 9, and it is in contact with the sealing plate 9 of the terminal plate 8, thereby operating as a positive electrode terminal.

Second Embodiment

The non-sintered type positive electrode was manufactured in such a manner as described in the first embodiment except for using 5 parts of 40% polystyrene dispersed solution instead of 4 parts of 50% polystyrene ethyl acrylate dispersed aqueous solution, thereby a non-sintered type positive electrode was fabricated and a single 4 typed alkaline storage battery was fabricated.

First Comparative Example

The substrate was manufactured in such a manner as described in the first embodiment, except that an opening of the upper bottom of the tetragonal aperture of each of the quadrangular pillar shaped protuberance was formed in a square form having the size of 0.2 mm×0.2 mm (at this time, the area of the opening of the upper bottom ab=0.04 mm, but not satisfying s=ab≧0.1 mm$^2$), thereby a non-sintered type positive electrode was prepared and a single 4 typed alkaline storage battery was fabricated.

Second Comparative Example

The substrate was manufactured in such a manner as described in the first embodiment, except that the upper bottom of each of the quadrangular pillar shaped protuberance was formed in a square form of 1.2 mm×1.2 mm (area c=1.44 mm$^2$, the lower bottom was formed in a square form of 1.6 mm×1.6 mm, the opening of the upper bottom was in a square form having the size of 1.0 mm×1.0 mm (at this time, a=1.6 mm, b=1.6 mm, area ab=1.0 mm$^2$), and the height; of the blanking burr h=0.45 mm, thereby a non-sintered type positive electrode was prepared and a single 4 typed alkaline storage battery was fabricated (at this time, the total thickness of the substrate is d=0.44 mm, but not satisfying 0.2≦h/d≦0.95).

Third Comparative Example

The substrate was manufactured in such a manner as described in the first embodiment, except that the pressure was increased, so that the thickness t of the electrode after compressing was 0.066 mm and t/d was 0.15. However, the electrode thus constructed was cracked or bent. As a result, the electrode could not be applied to a practical use.

<<Evaluation>>

The electrode (positive electrode) produced in the first and second embodiments and the first and second comparative examples is winded with the opposite electrode (negative electrode) through the interposed separator. Thereafter, the winded body is again unwound and then the unwound body is observed with the eye to find out whether peeling off of the mixtures exists. The result is follows.

TABLE 1

|  | Determination |
| --- | --- |
| First Embodiment | ◯ |
| Second Embodiment | ◯ |
| First Comparative Example | Δ |
| Second Comparative Example | ◯ |

"◯": peeling off is not found at all
"Δ": peeling off is found a little

As shown in Table 1, the peeling off of the mixture was not found in the first and second embodiments and the second comparative example. In the first comparative example, the opening of the substrate (the tetragonal shaped aperture formed at the upper bottom of each of the quadrangular pillar shaped protuberance) is small and the peeling off of the mixture is generated.

Next, Table 2 shows the ratio of short generation occurred while each of the alkaline storage batteries is fabricated in the first and second embodiments and the first and second comparative examples.

TABLE 2

|  | Short generation ratio (generation number/fabrication number) |
| --- | --- |
| First Embodiment | 0/100 |
| Second Embodiment | 0/100 |
| First Comparative Example | 3/100 |
| Second Comparative Example | 47/100 |

As shown in Table 2, the first and second embodiments do not generate short. The first Comparative example generates short in the ratio of 3/100 due to the peeling off of the mixture. It is found that the second comparative example generates a large number of shorts due to the exposure of blanking burrs of the substrate on a surface of the electrode.

Next, characteristics of batteries are evaluated.

The alkaline storage batteries as described in the first and second embodiments and the first and second comparative examples are aged at 60° C. during 6 hours, respectively, then charged in 0.2C (9 mA) during 10 hours. Next, each is again charged in 0.2C (90 mA) during 6 hours and discharged up to 1.0V in 0.2C (90 mA). This charge/discharge cycle is repeated until the discharge capacity becomes constant.

Next, charging is performed under 1C(450 mA) and 25° C. until the charging voltage is dropped from a peak value by 5 mV, discharging is done up to 1.0V in 1C(450 mA), and this charge/discharge cycle is repeated until it is dropped to 80% of the initial discharge capacity. Further, the coefficient of utilization of $1^{st}$ cycle was obtained. The result is shown in Table 3.

TABLE 3

|  | Coefficient of utilization of positive electrode | Cycle number |
|---|---|---|
| First Embodiment | 90% | 725 |
| Second Embodiment | 90% | 780 |
| First Comparative Example | 86% | 520 |
| Second Comparative Example | 80% | 530 |

In the first and second embodiments, the coefficients of utilization all are 90%, and the number of cycles is more than 700. In contrast, in the first and second comparative examples, the coefficient of utilizations is less than 90%, and the number of cycles is less than 600. In the first comparative example, the coefficient of utilization is reduced due to peeling off of the mixture, and the number of cycles is reduced due to an expansion of active material by charging/discharging during cycles, or acceleration in peeling off of the mixture by gas generation. Further, in the second comparative example, the coefficient of utilization of appearance is dropped due to a little short caused by an exposure of the substrate. Further, the number of cycles was reduced accordingly.

What is claimed is:

1. The electrode for electrochemical device, comprising an electrode substrate made of a metal plate and an electrode mixture layer formed on the substrate, which comprises metal, metal oxide or metal hydroxide as active materials, wherein said metal plate has a plurality of protuberances that are alternately protruded on both front and back surfaces thereof; each of the protuberances is formed in a truncated pyramid shape in which an area of an upper bottom part thereof is smaller than that of a lower bottom part; the upper bottom part of each of the protuberances is formed with an aperture having blanking burrs blanked in a substantially pyramid shape along a direction from the upper bottom part to the lower bottom part so that an opening of the upper bottom part of each of the protuberances is formed; and said metal plate is formed in accordance with c>s≧0.1 mm² and 0.2≦h/d≦0.95 where c is the area of the upper bottom part of each of the protuberances, s is the area of the aperture of the upper bottom part and h is the height of the blanking burrs, said metal plate with the electrode mixture is compressed such that a thickness t of the resulting electrode after compressing is in accordance with 0.2≦t/d≦0.95 where d is the total thickness of the electrode substrate before compressing, wherein said blanking burrs have ends which extend inwardly into the interior of each of said protuberances.

2. The electrode for electrochemical device according to claim 1, wherein said electrode has a thickness t in the range of 0.08 to 1.5 mm.

3. The electrode for electrochemical device according to claim 1, wherein each of the protuberances of the metal plate is shaped in a triangular or a quadrangular pyramid.

4. The electrode for electrochemical device according to claim 1, wherein the opening of the upper bottom part part is shaped in an equilateral triangle, a rectangular or a square.

5. The electrode for electrochemical device according to claim 1, wherein a side length of the polygon opening at the upper bottom is more than 0.1 mm.

6. The electrode for electrochemical device according to claim 1, wherein the electrode mixture layer is incorporated with styrene-acrylic resins or polystyrene as a binder for the electrode mixture layer.

7. The electrode for electrochemical device according to claim 1, wherein a tip part of the blanking burr of the metal plate is not exposed on the surface of the electrode mixture layer.

8. The electrode for electrochemical device according to claim 1, wherein the total thickness d of the substrate before compressing is in the range of 0.85 to 1.2 mm.

9. The electrode for electrochemical device according to claim 1, wherein the total weight of the electrode, substrate is in the range of 50 to 450 g/m².

10. An electrode for electrochemical device, comprising an electrode substrate made of metal plate and an electrode mixture layer formed on the electrode substrate, which comprises metal, metal oxide or metal hydroxide as an active material, wherein said metal plate has a plurality of protuberances that are alternately protruded on both front and back surfaces thereof; each of the protuberances is formed in a truncated pyramid shape in which an area of an upper bottom part or a protruded part thereof is smaller than that of a lower bottom part; the upper bottom part of each of the protuberances is formed with an aperture having blanking burrs blanked in a substantially pyramid shape along a direction from the upper bottom part to the lower bottom part so that an opening of the upper bottom part is formed in a polygon shape; and said metal plate is formed in accordance with c>s≧0.1 mm² and 0.2≦h/d≦0.95 where c is the area of the upper bottom part of each of the protuberances, s is the area of the opening of the upper bottom part and h is the height of the blanking burrs and d is the total thickness of the electrode substrate before compressing, said metal plate with the electrode mixture is compressed such that a thickness t of the resulting electrode after compressing is in the range of 0.08 to 1.5 mm, wherein said blanking burrs have ends which extend inwardly into the interior of each of said protuberances.

11. A battery provided with the electrode according to claim 1 or 10 as a positive electrode or a negative electrode.

* * * * *